(12) United States Patent
Ninan et al.

(10) Patent No.: US 9,781,417 B2
(45) Date of Patent: *Oct. 3, 2017

(54) HIGH DYNAMIC RANGE, BACKWARDS-COMPATIBLE, DIGITAL CINEMA

(71) Applicant: Dolby Laboratories Licensing Corporation, San Francisco, CA (US)

(72) Inventors: Ajit Ninan, San Jose, CA (US); Samir N. Hulyalkar, Los Gatos, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 402 days.

This patent is subject to a terminal disclaimer.

(21) Appl. No.: 14/508,026

(22) Filed: Oct. 7, 2014

(65) Prior Publication Data

US 2015/0023433 A1 Jan. 22, 2015

Related U.S. Application Data

(63) Continuation of application No. 13/468,674, filed on May 10, 2012, now Pat. No. 8,891,863.

(Continued)

(51) Int. Cl.
*H04N 19/85* (2014.01)
*H04N 21/2343* (2011.01)
(Continued)

(52) U.S. Cl.
CPC ......... *H04N 19/00903* (2013.01); *G06T 5/40* (2013.01); *H04N 19/33* (2014.11);
(Continued)

(58) Field of Classification Search
CPC .......... H04N 19/00–19/90; H04N 21/234327; H04N 21/41415; G06T 5/54
See application file for complete search history.

(56) References Cited

U.S. PATENT DOCUMENTS 7,639,882 B2 12/2009 Itakura
7,769,239 B2 8/2010 Demos
(Continued)

FOREIGN PATENT DOCUMENTS

JP 2011019126 A5 8/2012
WO WO2009002321 A1 12/2008
WO WO2010003692 A1 1/2010

OTHER PUBLICATIONS

Digital Cinema Initiative, LLC, "Digital Cinema Systems Specification" version 1.2, Mar. 2007.
(Continued)

*Primary Examiner* — Sean Motsinger

(57) ABSTRACT

HDR images are coded and distributed. An initial HDR image is received. Processing the received HDR image creates a JPEG-2000 DCI-compliant coded baseline image and an HDR-enhancement image. The coded baseline image has one or more color components, each of which provide enhancement information that allows reconstruction of an instance of the initial HDR image using the baseline image and the HDR-enhancement images. A data packet is computed, which has a first and a second data set. The first data set relates to the baseline image color components, each of which has an application marker that relates to the HDR-enhancement images. The second data set relates to the HDR-enhancement image. The data packets are sent in a DCI-compliant bit stream.

20 Claims, 9 Drawing Sheets

Related U.S. Application Data

(60) Provisional application No. 61/496,445, filed on Jun. 13, 2011.

(51) Int. Cl.
*H04N 21/414* (2011.01)
*H04N 19/64* (2014.01)
*H04N 19/33* (2014.01)
*G06T 5/40* (2006.01)
*H04N 19/44* (2014.01)

(52) U.S. Cl.
CPC ........... *H04N 19/44* (2014.11); *H04N 19/647* (2014.11); *H04N 19/85* (2014.11); *H04N 21/234327* (2013.01); *H04N 21/41415* (2013.01); *G06T 2207/20208* (2013.01)

(56) References Cited

U.S. PATENT DOCUMENTS

| | | | | |
|---|---|---|---|---|
| 8,248,486 B1* | 8/2012 | Ward | | H04N 9/67 348/222.1 |
| 8,334,911 B2* | 12/2012 | Jia | | H04N 9/67 348/222.1 |
| 8,508,617 B2* | 8/2013 | Jia | | H04N 9/67 348/222.1 |
| 2007/0047644 A1* | 3/2007 | Lee | | H04N 19/176 375/240.1 |
| 2007/0133889 A1* | 6/2007 | Horie | | H04N 19/176 382/232 |
| 2007/0258641 A1 | 11/2007 | Srinivasan | | |
| 2007/0291179 A1* | 12/2007 | Sterling | | H04N 1/6058 348/642 |
| 2007/0291847 A1* | 12/2007 | Shimauchi | | H04N 19/107 375/240.16 |
| 2008/0024389 A1* | 1/2008 | O'Brien-Strain | | H04N 9/3194 345/1.2 |
| 2008/0192819 A1* | 8/2008 | Ward | | G06T 5/009 375/240.02 |
| 2009/0110073 A1* | 4/2009 | Wu | | H04N 7/50 375/240.15 |
| 2010/0005418 A1 | 1/2010 | Miyazaki | | |
| 2010/0008418 A1* | 1/2010 | Wu | | H04N 19/186 375/240.12 |
| 2010/0020796 A1 | 1/2010 | Park | | |
| 2010/0027619 A1* | 2/2010 | Doser | | H04N 19/30 375/240.02 |
| 2010/0091840 A1* | 4/2010 | Gao | | H04N 19/105 375/240.2 |
| 2010/0111167 A1* | 5/2010 | Wu | | H04N 19/30 375/240.12 |
| 2010/0128786 A1* | 5/2010 | Gao | | H04N 19/147 375/240.13 |
| 2010/0135393 A1* | 6/2010 | Ying Gao | | H04N 19/00315 375/240.15 |
| 2010/0157078 A1* | 6/2010 | Atanassov | | G06T 5/007 348/222.1 |
| 2010/0172411 A1* | 7/2010 | Efremov | | H04N 19/136 375/240.12 |
| 2010/0208809 A1* | 8/2010 | Yin | | H04N 19/105 375/240.12 |
| 2010/0208810 A1* | 8/2010 | Yin | | H04N 19/105 375/240.12 |
| 2010/0220789 A1* | 9/2010 | Yuwen | | H04N 19/61 375/240.16 |
| 2010/0220795 A1* | 9/2010 | Yin | | H04N 19/159 375/240.29 |
| 2010/0220796 A1* | 9/2010 | Yin | | H04N 19/159 375/240.29 |
| 2011/0235720 A1* | 9/2011 | Banterle | | G06T 5/009 375/240.25 |
| 2012/0057788 A1* | 3/2012 | Fukuhara | | H04N 19/647 382/173 |
| 2012/0281009 A1* | 11/2012 | Ward | | H04N 9/67 345/589 |
| 2012/0314773 A1* | 12/2012 | Gish | | H04N 19/61 375/240.16 |
| 2012/0314944 A1* | 12/2012 | Ninan | | H04N 19/647 382/166 |
| 2013/0064462 A1* | 3/2013 | Ninan | | H04N 19/00533 382/233 |
| 2013/0071022 A1* | 3/2013 | Jia | | H04N 9/67 382/166 |

OTHER PUBLICATIONS

Hassan, F., et al., "High Throughput JPEG2000 Compatible Encoder for High Dynamic Range Images" ICIP 2008, pp. 1424-1427.

Kaida, H., et al., "Image Compression Suitable for High Dynamic Range Image Rendering" 22nd International Conference on Advanced Information Networking and Applications—Workshops, 2008 IEEE, pp. 1029-1032.

Manti Uk, R., et al., "Backward Compatible High Dynamic Range MPEG Video Compression" Jul. 2006.

Manti Uk, R., et al., "High Dynamic Range Image and Video Compression—Fidelity Matching Human Visual Performance" 2007.

Okuda, M., et al, "Effective Color Space Representation for Wavelet Based Compression of HDR Images" 14th International Conference on Image Analysis and Processing 2007.

Richter, Thomas, "Evaluation of Floating Point Image Compression" 2009 IEEE, pp. 1909-1912.

Springer, D., et al., "Lossy Compression of Floating Point High Dynamic Range Images Using JPEG2000" Proc. of SPIE, IS &T Electronic Imaging, SPIE vol. 7257, 2009.

Ward, G., et al., "JPEG-HDR: A Backwards-Compatible, High Dynamic Range Extension to JPEG" ACM 2006.

Ward, G., et al., "Subband Encoding of High Dynamic Range Imagery" ACM 2004.

XDepth "About XDepth" undated, accessed Apr. 12, 2011.

Xu, R., et al., "High Dynamic Range Still-Image Encoding in JPEG 2000" published by the IEEE Computer Society, Nov./Dec. 2005, IEEE Computer Graphics and Applications, pp. 69-76.

Xu, Ruifeng, "Real-Time Realistic Rendering and High Dynamic Range Image Display and Compression" ACM 2005.

Office Action issued in U.S. Appl. No. 13/468,674 dated Sep. 26, 2013, 17 pages.

Office Action issued in U.S. Appl. No. 13/468,674 dated Jan. 17, 2014, 11 pages.

Office Action issued in U.S. Appl. No. 13/468,674 dated Apr. 24, 2014, 15 pages.

Notice of Allowance issued in U.S. Appl. No. 13/468,674 dated Aug. 25, 2014, 15 pages.

\* cited by examiner parse an image file comprising a tone-mapped (TM) image and HDR reconstruction data, the HDR reconstruction data comprising quantized luminance ratio values and quantized residual values in color channels of a color space; the TM base image comprising one or more color alterations that are not recoverable from the TM base image with a luminance ratio image 922 extract quantization parameters relating to the quantized luminance ratio values and the quantized residual values in the color channels of the color space 924 convert, based at least in part on the quantization parameters, the quantized luminance ratio values and the quantized residual values into luminance ratio values and residual values in the color channels of the color space 926 reconstruct an HDR image using the TM base image and the luminance ratio values and residual values in the color channels of the color space 928

FIG. 9

HIGH DYNAMIC RANGE, BACKWARDS-COMPATIBLE, DIGITAL CINEMA

CROSS REFERENCE TO RELATED APPLICATIONS

This application is a continuation of U.S. application Ser. No. 13/468,674, filed on May 10, 2012, which claims the benefit of priority U.S. Provisional Application No. 61/496,445 filed on Jun. 13, 2011, the contents of which are incorporated by reference.

TECHNOLOGY

The present invention relates generally to digital cinema. More particularly, an embodiment of the present invention relates to the coding and transmission of high dynamic range (HDR) images in a format that is backwards compatible with existing digital cinema specifications.

BACKGROUND

As used herein, the term 'dynamic range' (DR) may relate to a capability of the human psychovisual system (HVS) to perceive a range of intensity (e.g., luminance, luma) in an image, e.g., from darkest darks to brightest brights. In this sense, DR relates to a 'scene-referred' intensity. DR may also relate to the ability of a display device to adequately or approximately render an intensity range of a particular breadth. In this sense, DR relates to a 'display-referred' intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans the some 14-15 orders of magnitude of the human visual system (HVS). For example, well adapted humans with essentially normal (e.g., in one or more of a statistical, biometric or opthamological sense) have an intensity range that spans about 15 orders of magnitude. Adapted humans may perceive dim light sources of as few as a mere handful of photons. Yet, these same humans may perceive the near painfully brilliant intensity of the noonday sun in desert, sea or snow (or even glance into the sun, however briefly to prevent damage). This span though is available to 'adapted' humans, e.g., those whose HVS has a time period in which to reset and adjust.

In contrast, the DR over which a human may simultaneously perceive an extensive breadth in intensity range may be somewhat truncated, in relation to HDR. As used herein, the terms 'visual dynamic range' or 'variable dynamic range' (VDR) may individually or interchangeably relate to the DR that is simultaneously perceivable by a HVS. As used herein, VDR may relate to a DR that spans 5-6 orders of magnitude. Thus while perhaps somewhat narrower in relation to true scene referred HDR, VDR nonetheless represents a wide DR breadth. As used herein, the term 'simultaneous dynamic range' may relate to VDR.

Until fairly recently, displays have had a significantly narrower DR than HDR or VDR. Television (TV) and computer monitor apparatus that use typical cathode ray tube (CRT), liquid crystal display (LCD) with constant fluorescent white back lighting or plasma screen technology may be constrained in their DR rendering capability to approximately three orders of magnitude. Such conventional displays thus typify a low dynamic range (LDR), also referred to as a standard dynamic range (SDR), in relation to VDR and HDR.

Advances in their underlying technology however allow more modern display designs to render image and video content with significant improvements in various quality characteristics over the same content, as rendered on less modern displays. For example, more modern display devices may be capable of rendering high definition (HD) content and/or content that may be scaled according to various display capabilities such as an image scaler. Moreover, some more modern displays are capable of rendering content with a DR that is higher than the SDR of conventional displays.

For example, some modern LCD displays have a backlight unit (BLU) that comprises a light emitting diode (LED) array. The LEDs of the BLU array may be modulated separately from modulation of the polarization states of the active LCD elements. This dual modulation approach is extensible (e.g., to N-modulation layers wherein N comprises an integer greater than two), such as with controllable intervening layers between the BLU array and the LCD screen elements. Their LED array based BLUs and dual (or N-) modulation effectively increases the display referred DR of LCD monitors that have such features.

Such "HDR displays" as they are often called (although actually, their capabilities may more closely approximate the range of VDR) and the DR extension of which they are capable, in relation to conventional SDR displays represent a significant advance in the ability to display images, video content and other visual information. The color gamut that such an HDR display may render may also significantly exceed the color gamut of more conventional displays, even to the point of capably rendering a wide color gamut (WCG). Scene related HDR or VDR and WCG image content, such as may be generated by "next generation" movie and TV cameras, may now be more faithfully and effectively displayed with the "HDR" displays (hereinafter referred to as 'HDR displays').

As with the scalable video coding and HDTV technologies, extending image DR typically involves a bifurcate approach. For example, scene referred HDR content that is captured with a modern HDR capable camera may be used to generate an SDR or a VDR version of the content, which may be displayed on VDR displays or conventional SDR displays. In one approach, as described in U.S. provisional application 61/476,174 "Improved encoding, decoding, and representing high dynamic range images," by W. Jia et al., herein incorporated by reference for all purposes, the SDR version is generated from the captured VDR version by applying a tone mapping operator (TMO) to intensity (e.g., luminance, luma) related pixel values in the HDR content. The Jia application also describes how an HDR image can be represented by a baseline SDR image, a ratio image, and a chroma residual.

The "Digital Cinema Systems Specification," Version 1.2, Mar. 7, 2008, by Digital Cinema Initiatives, LLC, is referred to herein as the DCI System Specification, or simply as DCI, defines the technical specifications and requirements for the mastering, coding, and distribution of digital cinema content. DCI supports video streams at two resolutions: 2K (2048×1080) and 4K (4096×2160). Furthermore, DCI images are coded as 12-bit, X'Y'Z' color channels, using the JPEG 2000 coding standard. This representation is inadequate to fully represent HDR content. Embodiments of this invention describe methods for the mastering, coding, and distribution of HDR content in formats that are backwards compatible with the existing DCI specification. As used herein, "JPEG-2000" refers to the JPEG-2000 compressor/decompressor (codec) standard of the Joint Motion Picture Experts Group (JPEG). As used herein, 'TIFF' refers to a Tagged Image File Format.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which:

FIG. 9 illustrates example process flows, according to an embodiment.

DESCRIPTION OF EXAMPLE EMBODIMENTS

Embodiments describe the coding and transmission of high dynamic range (HDR) images in a format that is backwards compatible with existing digital cinema specifications, such as those promulgated by Digital Cinema Initiatives (DCI). In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Overview

An embodiment of the present invention codes and distributes high dynamic range (HDR) images. An initial HDR image is received. Processing the received HDR image creates a coded baseline image, which is compliant with the Digital Cinema Systems Specification of the Digital Cinema Initiative (DCI Systems Standard), and one or more HDR-enhancement images. The coded baseline image has one or more color components. The coded baseline image and the one or more HDR-enhancement images each provide enhancement information. The enhancement information allows reconstruction of an instance of the received HDR image using the baseline image and the HDR-enhancement images. A data packet is computed. The data packet has a first data set and a second data set, separated by an application marker. The first data set relates to the one or more baseline image color components, each of which has an application marker that relates to the HDR-enhancement images. The second data set is formed in relation to one of the HDR-enhancement images. The data packets are sent in a bit stream that conforms to the DCI Systems Standard. Upon receipt of the data packets, a DCI-compliant decoder may process the packets to reconstruct an instance of the initial HDR image, according to the information from the baseline image and the HDR-enhancement images.

Thus, an embodiment represents an original HDR image as a JPEG-2000 baseline image with components that are added to enhance the baseline image. The additional enhancement information components include a luminance ratio image and one or more optional chroma residual images. DCI-compliant decoders may all decode the baseline image. Decoders that have the capability to decode HDR images may use the baseline image, along with the added enhancement components to decode the full HDR image, e.g., an instance of the original HDR image. An embodiment multiplexes the base layer and the HDR-enhancement component data into a single, backwards compatible, DCI-compliant stream.

DCI System Specification

Figure 1:
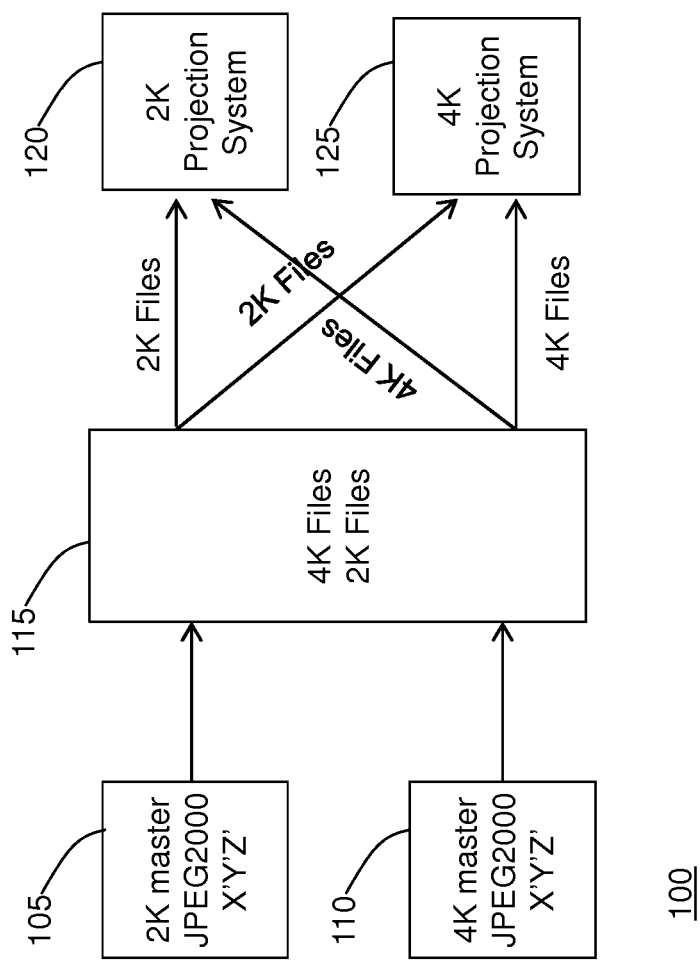
FIG. 1 depicts SDR digital cinema system work flow according to the DCI specification.

FIG. 1 depicts a simplified diagram of a digital cinema system workflow according to the current DCI systems specification. DCI specifies the structure of a Digital Cinema Distribution Master (DCDM) which is used to exchange image, audio, and metadata. Once a DCDM is compressed, encrypted and packaged for distribution, then it is considered a Digital Cinema Package (DCP) (115). DCDMs use a hierarchical image structure that supports both 2K (105) and 4K (110) resolution master files. A studio can choose to deliver either a 2K or a 4K master. Both 2K (120) and 4K (125) projectors can decode both 2K and 4K distributions. A 4K projector receiving a 2K file can optionally upscale it. A 2K projector receiving a 4K master extracts and uses the data for decoding the 2K output from the 4K distribution. Up-sampling 2K content or down-sampling 4K content is not a requirement for any of the DCI-compliant projectors.

Uncompressed DCDM files use a TIFF-like file format where image frames are coded using 12-bit unsigned integers in the X'Y'Z' color space. For compression, DCI uses the JPEG 2000 standard (ISO/IEC 15444-1).

Figure 2:
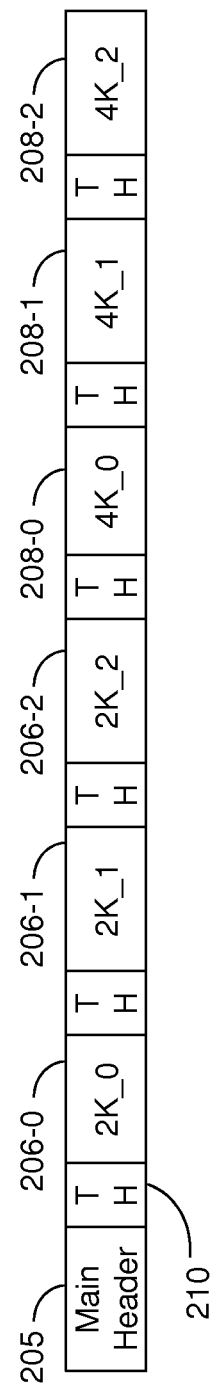
FIG. 2 depicts an SDR digital cinema codestream structure according to the DCI specification.

As depicted in FIG. 2, each compressed frame of a DCI distribution consists of tiles. In a 2K distribution, each frame has exactly 3 tiles, each tile containing a Tile-part Header (TH) 210 and data from one color component (206-0, 206-1, and 206-2). In a 4K distribution, each frame has 6 tile parts. The first 3 tile parts can be used by a 2K decoder to reconstruct a 2K output. The remaining 3 tile parts (208-0, 208-1, and 208-2) contain additional data to decompress each of the 4K color components.

To accommodate HDR images in a DCI compliant milieu, an HDR DPCM master may be created. Both an SDR and an HDR instance of content, such as a movie, are thus produced, which essentially doubles the size of the files with which the content is stored and/or transmitted, and concomitantly increases the bandwidth consumed in such transmission. An embodiment of the present invention provides an HDR-capable DCI-compliant system that is backwards-compatible with conventional DCI systems, which thus obviates dual production, storage and transmission of both an SDR version and an HDR version of the same content.

Example Enhancements

Figure 3:
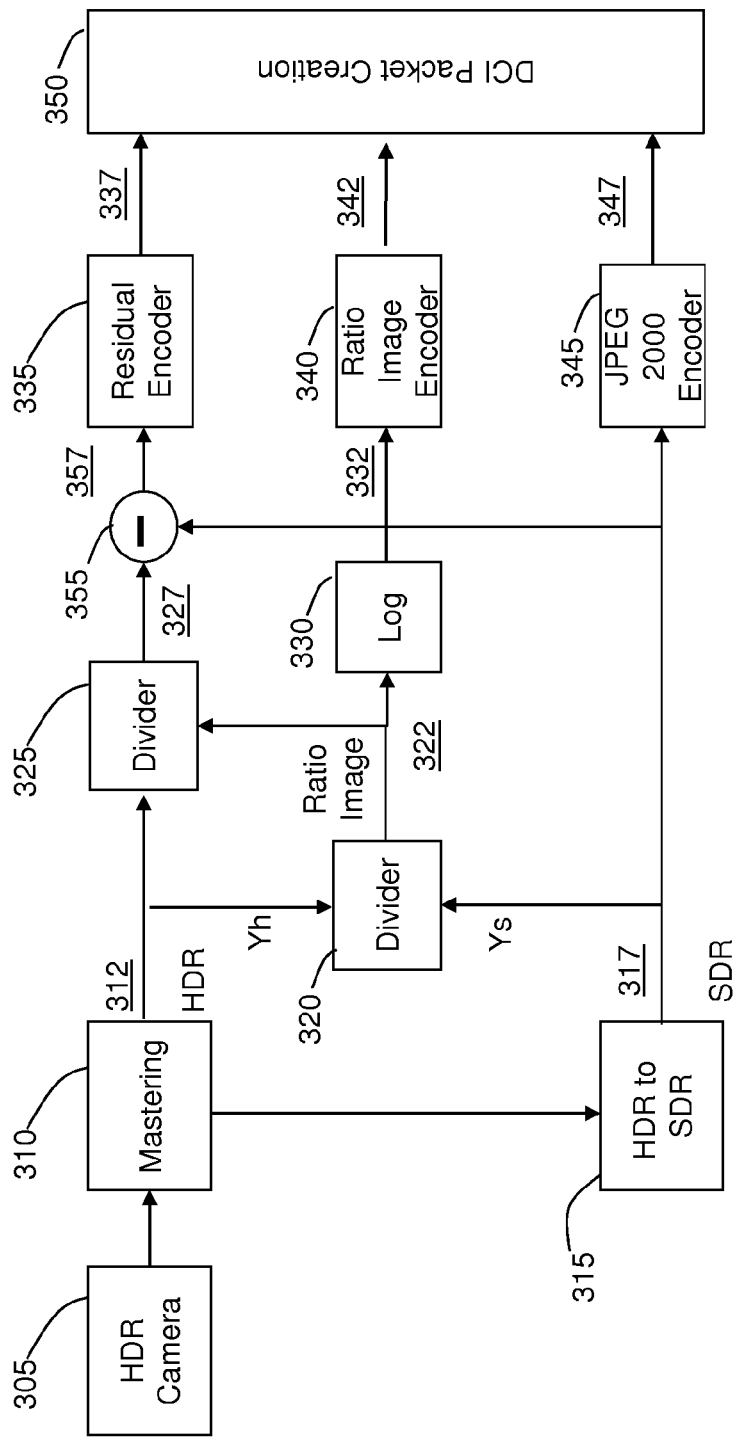
FIG. 3 depicts an example layered HDR encoding system according to an embodiment of the present invention.

FIG. 3 depicts an example HDR DCI-like encoding system 300, according to an embodiment of the present invention. An HDR image or video sequence is captured, e.g., using HDR camera 305. The HDR sequence may also be created or synthesized, such as with techniques that relate to computer generated images (CGI). Following capture, the captured image or video is processed by a mastering process to create a target HDR image 312. The mastering process may incorporate a variety of processing steps, such as: editing, primary and secondary color correction, color transformation, and noise filtering. The HDR output 312 of this process represents the director's intent on how the captured image will be displayed on a target HDR projector or display.

The input HDR image may be in any color space that supports a high dynamic range color gamut. In an example embodiment, the input HDR image is an RGB image. In an example, each pixel in the input HDR image comprises floating-point pixel values for all channels (e.g., red, green, and blue color channels in the RGB color space) defined in the color space. In another example, each pixel in the input HDR image comprises fixed-point pixel values for all channels (e.g., 16 bits or higher/lower numbers of bits fixed-point pixel values for red, green, and blue color channels in the RGB color space) defined in the color space. Each pixel may optionally and/or alternatively comprise down-sampled pixel values for one or more of the channels in the color space.

The mastering process may also output a corresponding SDR image 317, representing the director's intent on how the captured image will be displayed on a legacy SDR projector or display. The SDR output 317 may be provided directly from mastering circuit 310 or it may be generated by a separate HDR-to-SDR converter 315, such as tone mapping operator (TMO). The input SDR image may also be in any color space that supports a standard dynamic range color gamut. In an example embodiment it may be in YCbCr or YUV color space.

In an example embodiment, the HDR 312 and SDR 317 signals are input into Divider 320 which produces a ratio image 322. Ratio image 322 represents the pixel by pixel ratios of the HDR luminance component (say, Yh) over the SDR luminance component (say, Ys). Depending on the color space representation of both the HDR and SDR inputs, Divider 320 may also perform inverse gamma operations, color transformations, or other preprocessing operations (not shown).

Because of the large dynamic range of the pixels in the Ratio image 322, a Log unit 330 transforms image 322 into a Log ratio image 332, which subsequently may also be processed by a Ratio image encoder 340, which outputs an encoded ratio image 342. In an alternative implementation, the Log operation may be performed directly on the luminance (or luma) signals Yh and Ys, and division in 320 can be replaced by subtraction.

HDR signal 312 and the Ratio image 322 are also input into Divider 325. If the HDR to SDR transformation maintained the original color balance and there is no color clipping, then a multiplication of the SDR image 317 with the Ratio image 322 should match the input HDR image color by color. However, in practice, there are differences in the chrominance (or chroma) channels between the HDR and SDR signals. Given the ratio image 322, Divider 325 remaps the chroma channels of HDR signal 312 into an approximation (327) of the chroma channels of SDR input 317. Thus, subtractor 355, which computes the chroma difference between signals 327 and the SDR signal 317, captures chroma information that might have been lost during the HDR to SDR process 315. This chroma residual may be encoded and compressed further by Residual encoder 335 to yield coded residual 337.

SDR signal 317 is also coded using a JPEG 2000 DCI encoder (345) to output the baseline, DCI-compliant, image 347.

In an embodiment of the present invention, each frame in the original HDR input 312 is coded using three images: a baseline CDI-compliant image, a coded Ratio image, and two coded Chroma residual images. Note that according to another embodiment of this invention, if the values of the residual chroma images are too small, then they can be removed and not be included as part of the enhancement images.

Figure 4:
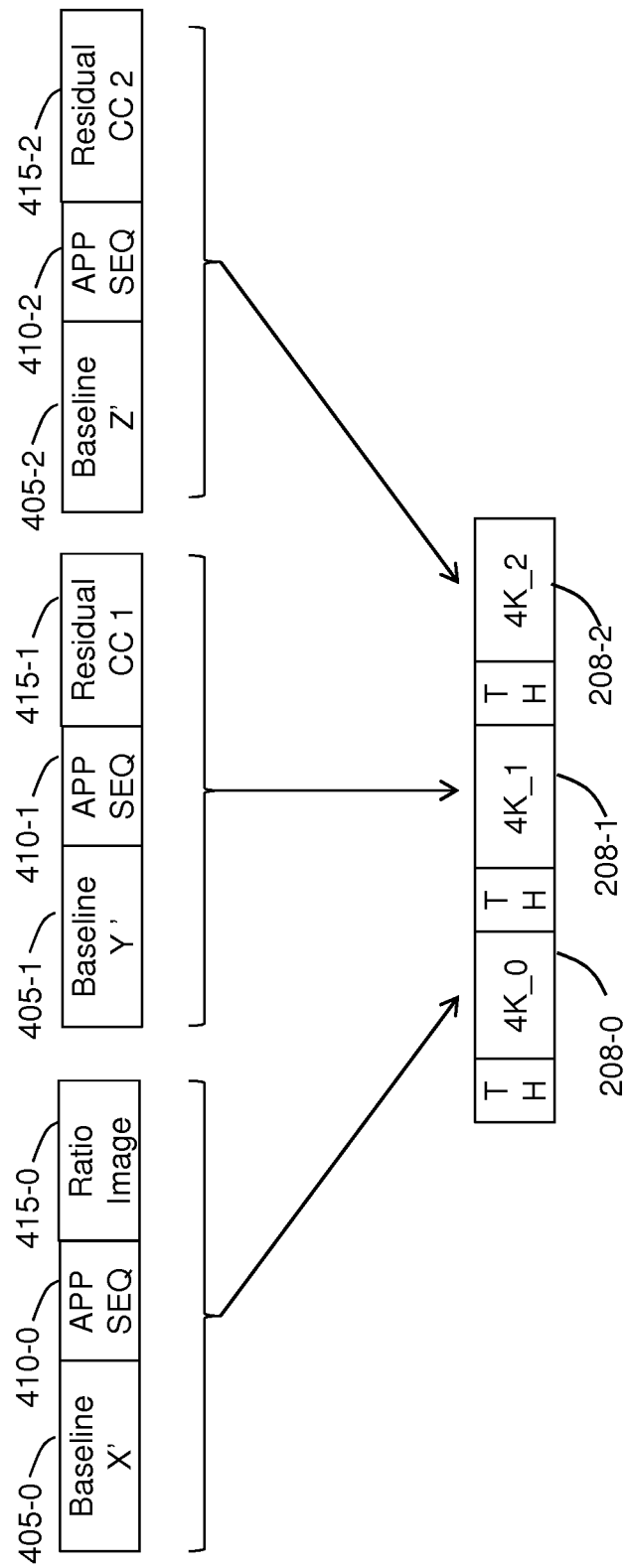
FIG. 4 depicts an example HDR DCI codestream structure according to one embodiment of the present invention.

FIG. 4 depicts how these three images are multiplexed and packetized into a DCI-compliant bitstream (350) according to an embodiment of the invention. JPEG 2000 coding syntax allows an encoder to insert application specific markers into the bitstream. A JPEG 2000 compliant decoder which does not recognize the marker, will simply ignore all data following it. However, a JPEG 2000 decoder which recognizes the marker can extract the additional information and process the data as needed. The use of such markers allows embodiments of this invention to construct a single, fully compliant, DCI stream, that supports both SDR and HDR playback.

Denote by APP SEQ (410) a JPEG 2000 marker that in a DCI stream may identify HDR-specific data. Given a 4K DCI bitstream, FIG. 4 depicts an example of how to embed HDR-enhancement information in to the 4K packets. Since each packet 208 corresponds to bitstream information for a specific color channel (X', Y', or Z'), one can apply a single HDR-enhancement application marker to all of the HDR-enhancement information. In one implementation, the coded ratio image data (415-0) may be embedded into the 4K_0 packet (208-0), as part of the baseline X' data (405-0), the coded residual for the first color component (CC) (415-1), say Cb, may be embedded into the 4K_1 packet (208-1), as part of the baseline Y' data (405-1), and the coded residual for the second color component (415-2), say Cr, may be embedded into the 4K_2 packet (208-2), as part of the baseline Z' data (405-2).

Under this scheme, a legacy DCI projector will ignore the HDR-enhancement data and will simply decode an SDR 4K or 2K bitstream. However, as shown in FIG. 5, an HDR DCI decoder can extract all the HDR-enhancement information and reconstruct and display an HDR bitstream.

It should be appreciated that the example packet structure in FIG. 4 is independent on how the Ratio image and the Chroma residual images are coded inside the packets. For example, luma ratio and chroma residuals can be transformed and coded in a device-independent color space, as the baseline images. Furthermore, instead of using a single application marker, two or more separate and distinct markers may be used.

The packet structure shown in FIG. 4 is also applicable to other possible configurations. In an example implementation, the HDR-enhancement data may be multiplexed with the three 2K packets. In an example implementation, the HDR-enhancement data may be spread across both the 2K and 4K data packets.

Figure 5:
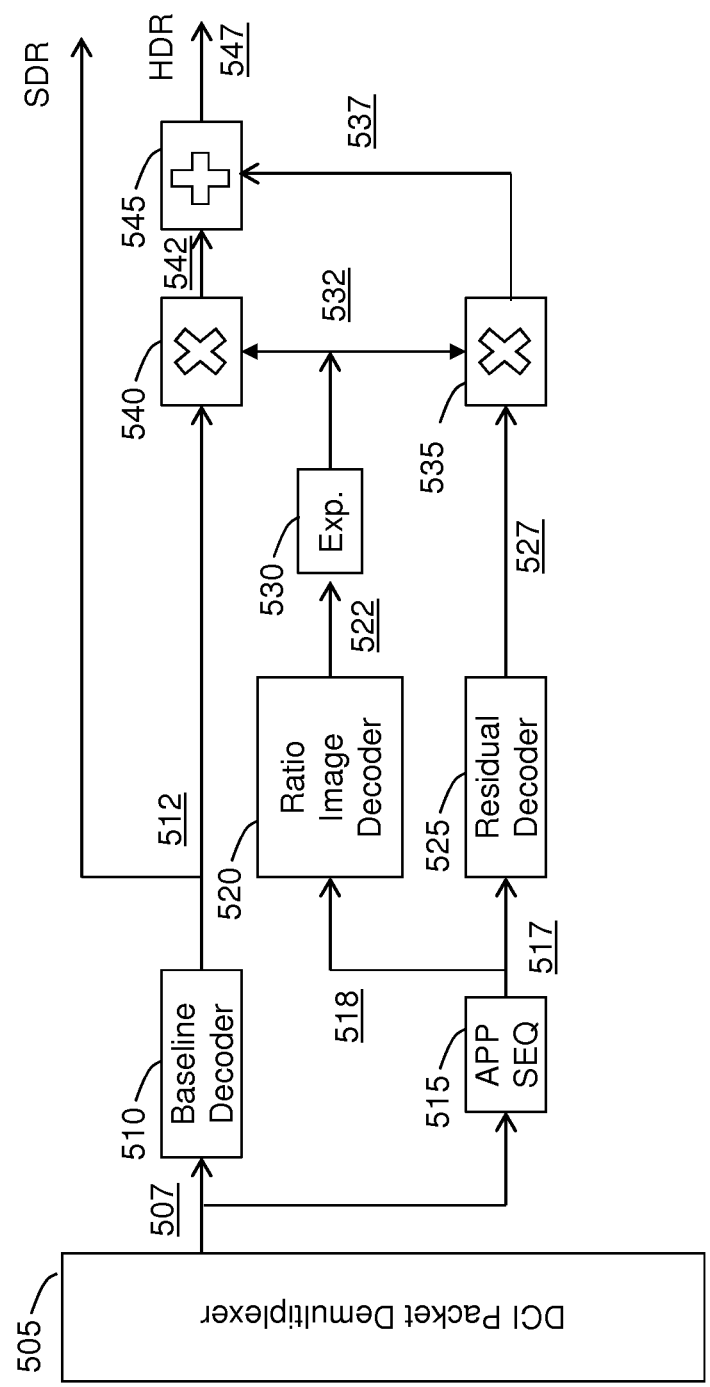
FIG. 5 depicts an example, backwards compatible, HDR DCI decoding system according to an embodiment of the present invention.

FIG. 5 depicts an example implementation of a DCI compliant, backwards-compatible, decoding system according to the methods of this invention. DCI packets are demultiplexed and decoded according to the existing DCI specification. A legacy decoder will ignore application-specific HDR-enhancement markers and extract a baseline SDR stream 512. However, an HDR DCI decoder will recognize the APP SEQ markers (515) and extract the additional, HDR-enhancement information, such as the coded Ratio image 518 and the coded chroma residuals 517. Following decoding (520 and 530) which extracts a Log ratio image and converts it back to pixel data (532), the ratio image is multiplied by both the extracted SDR image (512) and the chroma residuals (525) to derive a first estimate of the HDR signal (542) and missing chroma information (537). These two signals are added together in adder 545 to create a reconstructed HDR signal 547. The baseline SDR signal 512 and the HDR-enhancement information (517 and 518) may be in different color spaces and chroma formats. Thus, an embodiment performs or accommodates additional color correction, color transformation, and post-processing operations. Following the extraction of the HDR 547 and SDR 512 signals, a DCI decoder may also perform additional display-specific color management processing.

Figure 6:
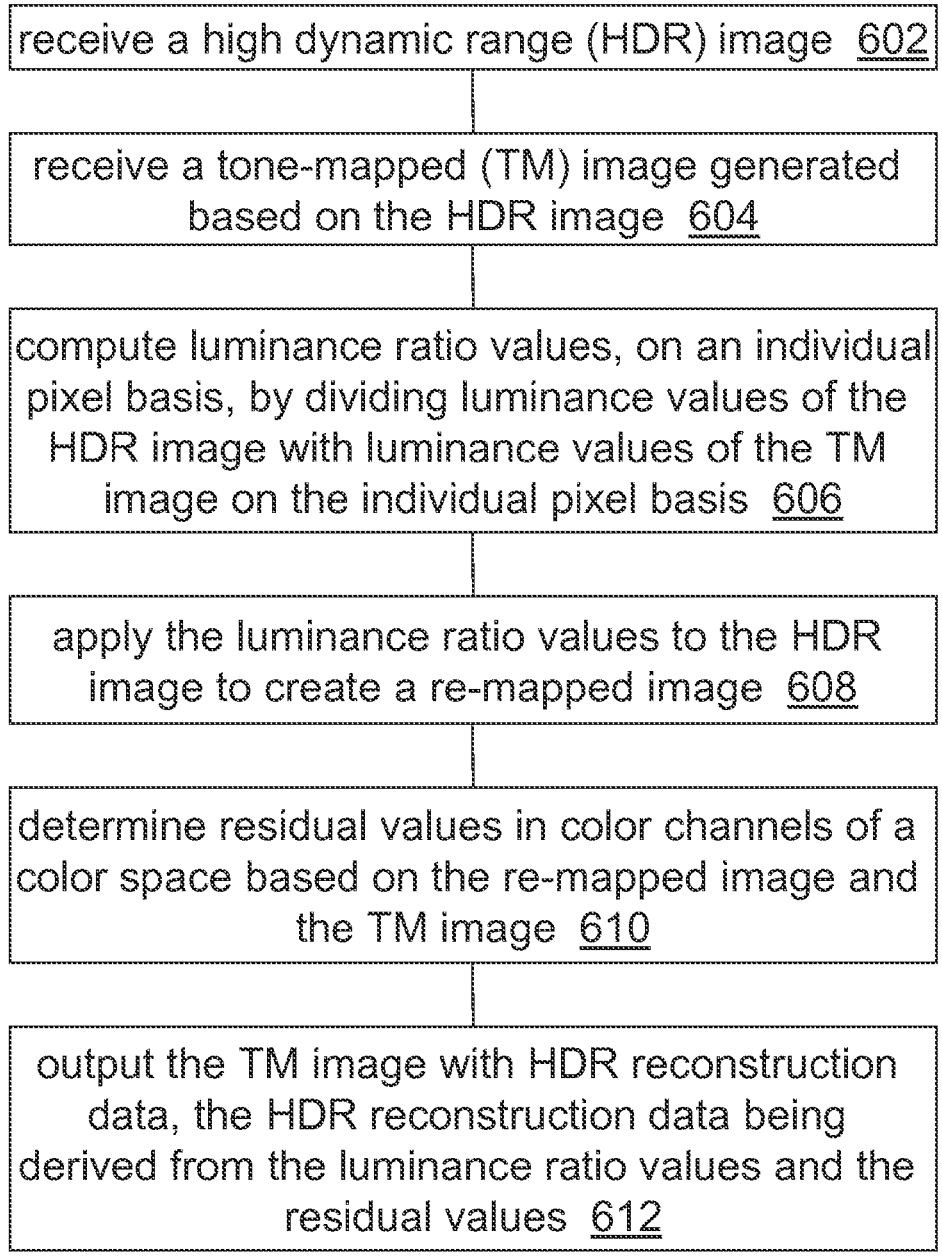
FIG. 6 depicts an example process flow to generate an HDR image according to an embodiment.

FIG. 6 illustrates an example process flow according to a possible embodiment of the present invention. In some possible embodiments, one or more computing devices or components such as an HDR image encoder may perform this process flow. The HDR image encoder may be implemented by adding one or more new processing blocks to and/or modifying one or more existing processing blocks in, a standard-based image encoder such as a JPEG image encoder. In block 602, the HDR image encoder receives a high dynamic range (HDR) image. In an example embodiment, the HDR image is one of a fixed-point image or a floating-point image. In an example embodiment, the HDR image is encoded in one of JPEG, JPEG-2000, MPEG, AVI, TIFF, BMP, GIFF, or another image format.

In block 604, the HDR image encoder also receives a tone-mapped (TM) image that was generated based on the HDR image. The TM image comprises one or more color alterations that are not recoverable from the TM image with a luminance ratio image. In an example embodiment, at least one of the one or more color alterations in the TM image is caused by one of clippings (e.g., in R, G, or B pixel values), or alterations of hues at one or more pixels.

In block 606, the HDR image encoder computes luminance ratio values, on an individual pixel basis, by dividing luminance values of the HDR image with luminance values of the TM image on the individual pixel basis.

In block 608, the HDR image encoder applies the luminance ratio values to the HDR image to create a re-mapped image.

In an example embodiment, the HDR image encoder converts at least one of the re-mapped image and the TM image from one color space to a different color space.

In block 610, the HDR image encoder determines residual values in color channels of a color space based on the re-mapped image and the TM image. If the original color is altered, at least one of the residual values is non-zero. In an example embodiment, the color space is an YCbCr color space; the color channels of the color space comprise a Cb color channel and a Cr color channel. The residual values in the color channels of the color space are calculated as differences between first pixel values, as derived from the re-mapped image, in the color channels and second pixel values, as derived from the TM image, in the color channels.

In block 612, the HDR image encoder outputs a version of the TM image with HDR reconstruction data. The HDR reconstruction data is derived from the luminance ratio values and the color-channel residual values.

In an example embodiment, the HDR reconstruction data comprises a residual image with quantized values derived from the luminance ratio values and the residual values in the color channels of the color space. The HDR reconstruction data may further comprise parameters specifying ranges of the quantized values.

In an example embodiment, the HDR reconstruction data is stored in an application segment of an image file with the TM image as a base image in the image file. In an example embodiment, the image file is in a JPEG-HDR format.

In an example embodiment, the HDR image encoder may perform one or more sanity checks on the HDR image, for example, before the HDR image is manipulated by a tone mapping operator (TMO) or a user. In an example embodiment, the HDR image encoder replaces zero, one, or more color-channel zero-values in the TM image with values smaller than a threshold value. This threshold value may be 1, 2, 3, . . . , 10, 11, etc. in various possible embodiments.

In an example embodiment, any tone mapping operations with any TMO and/or any color alterations on any number of pixels in the TM image may be performed in the process of generating the TM image.

In an example embodiment, the HDR image encoder applies a color space conversion to at least one of the HDR image, the TM image, or the re-mapped image.

In an example embodiment, luminance residual values between the TM image and the re-mapped image are all zeros. For example, in a color space (e.g., YUV) with a luminance channel (e.g., Y) and two color channels (e.g., Cb and Cr), differences in luminance values between the TM image and the re-mapped image (e.g., already, or alternatively after a color space conversion, in the color space) may be all zeros.

Figure 7:
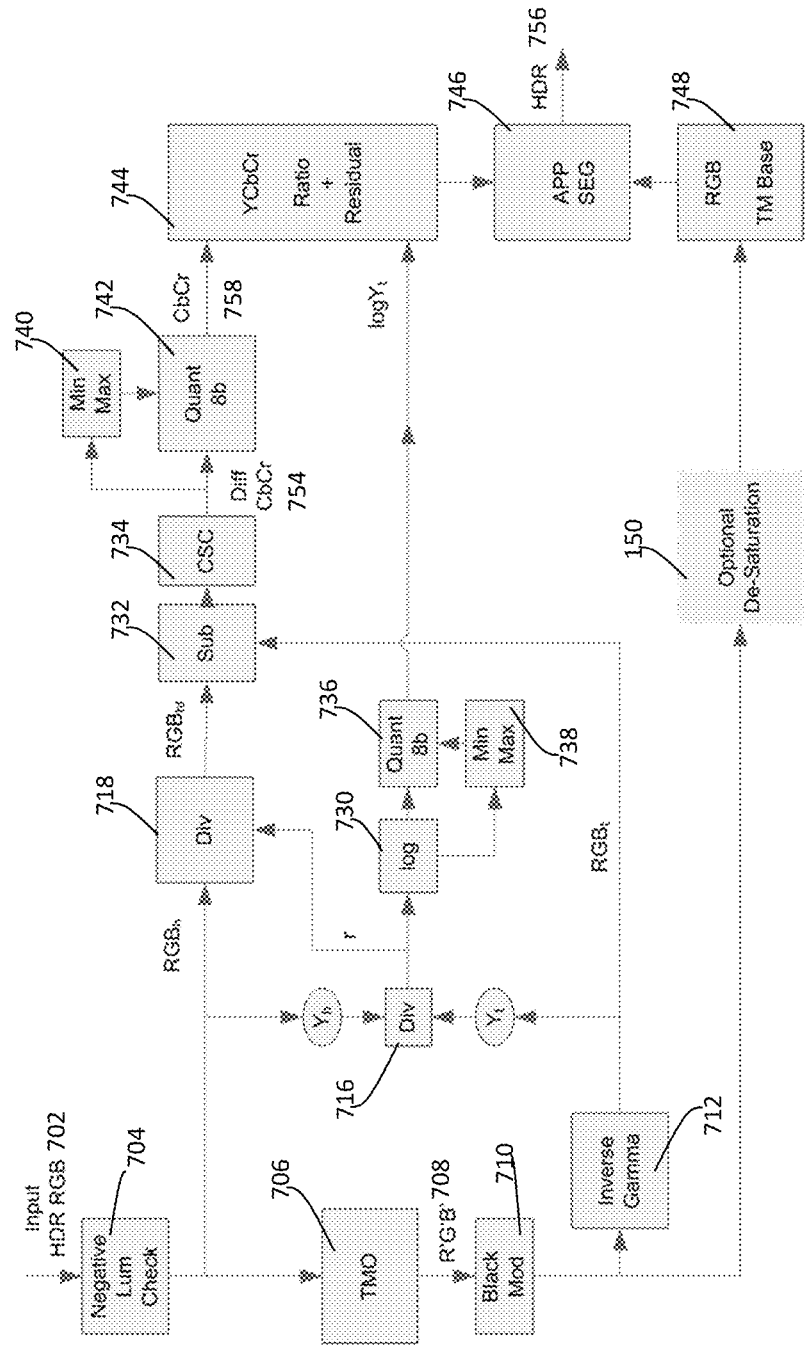
FIG. 7 illustrates an example HDR image encoder, according to some embodiments.

FIG. 7 illustrates an example HDR image encoder, in accordance with some possible embodiments of the present invention. In some possible embodiments, the HDR image encoder is implemented by one or more computing devices, and configured with software and/or hardware components that implement image processing techniques for encoding an input HDR image into a TM image with HDR reconstruction data in a standard-based or proprietary image format.

The HDR image encoder comprises software and/or hardware components configured to receive an input HDR image. As used herein, an "input HDR image" refers to any HDR image that may comprise floating-point or fixed-point high dynamic range image data. The input HDR image may be in any color space that supports a high dynamic range color gamut. In an example embodiment, the input HDR image is an RGB image (e.g., Input HDR RGB 702 as illustrated in FIG. 7) in an RGB color space. In an example, each pixel in the input HDR image comprises floating-point pixel values for all channels (e.g., red, green, and blue color channels in the RGB color space) defined in the color space. In another example, each pixel in the input HDR image comprises fixed-point pixel values for all channels (e.g., 16 bits or higher/lower numbers of bits fixed-point pixel values for red, green, and blue color channels in the RGB color space) defined in the color space. Each pixel may optionally and/or alternatively comprise downsampled pixel values for one or more of the channels in the color space.

In an example embodiment, the HDR image encoder comprises software and/or hardware components configured to perform a number of pre-processing steps. Optionally and/or alternatively, the pre-processing steps include, but are not limited, to zero or more sanity checks on the input HDR image, etc. For example, an input HDR image may or may not comprise pixel values implying negative luminance values, for example, introduced by an upstream step or by local data corruption introduced in encoding or transmission. To prevent an underlying luminance value from being negative thereby causing problems in subsequent tone mapping operations, underlying luminance values in the input HDR image are checked with a sanity check (Negative Lum Check 704). If an underlying luminance value of a pixel is not positive, pixel values for all the color channels of the pixel may be set to zero.

In possible embodiments in which a luminance value is not directly given for a pixel in a color space, a luminance value for the pixel may be (indirectly) derived from pixel values of the pixel in the color space. In an example embodiment, pixel values, R, G, and B, in a RGB color space for a pixel may be used to compute the luminance value, Y, for the pixel, as follows:

$$Y=0.30078125*R+0.59765625*G+0.1015625*B \qquad \text{expression (1)}$$

The input HDR image, which may or may not be preprocessed, is provided to a tone mapping operator (TMO 706).

In an example embodiment, the TMO 706 comprises software and/or hardware components configured to generate, based on the input HDR image (which may be preprocessed), a tone mapped (TM) image that may be rendered on a wide variety of display devices. Under techniques described herein, the TMO 706 is treated as a black box in the HDR image encoder. The TMO 706, or a user who employs the TMO 706 to manipulate the input HDR image, may freely introduce one or more color alterations that affect hues or chroma properties in some or all portions of the output TM image from the TMO 706. Under techniques described herein, the TM image with the color alterations freely made by the TMO 706 or user may be provided as a base image to downstream devices, along with HDR reconstruction data created under the techniques described herein that may be used to reproduce/render the HDR image. The HDR reconstruction data provides sufficient information to a recipient downstream device to reproduce the HDR image free of the color alterations made by the TMO 706.

Optionally and/or alternatively, the HDR image encoder comprises software and/or hardware components (Black Mod 710) configured to perform black modifications on the output of the TMO 706, the TM image (R'G'B' 708). The HDR image encoder, or Black Mod 710 therein, locates zero pixel values in the TM image (R'G'B' 708). In an example, if a pixel value for a color channel is zero, the pixel value is given a small value such as 1, 2, 10, or another larger or smaller value. In another example, if the luminance value for a pixel is zero, the pixel values for one or more color channels are given small values such as 1, 2, 10, or other larger or smaller values. A small pixel value (e.g., below 10) may not make a visual difference perceptually.

The TM image (R'G'B' 708) may or may not be an 8-bit gamma corrected image. For the purpose of illustration only, the tone mapped image (R'G'B' 708) outputted by the TMO 706 has been gamma corrected within the TMO 706. Optionally and/or alternatively, the HDR image encoder comprises software and/or hardware components (Inverse Gamma 712) configured to convert the tone mapped image (R'G'B' 708) to an intermediate tone-mapped image (RGBt) in a linear domain if an output parameter or a return value of the TMO 706 indicates that gamma correction has been performed within the TMO 706. The gamma curve used for gamma correction and/or for gamma conversion may be related to a standard color space such as sRGB or Adobe RGB, which may be indicated by the TMO 706 using one or more output parameters or return values. In an example embodiment, RGBt may be used to further derive luminance ratios and residual values as described herein.

In an example embodiment, luminance values ($Y_h$) in the input HDR image ($RGB_h$) and luminance values ($Y_t$) in RGBt may be calculated. In some possible embodiments, $Y_h$, $Y_t$, and luminance ratios (r) between $Y_h$ and $Y_t$, may be calculated on an individual pixel basis as follows:

$$Y_h=L(RGB_h)=0.30078125*R_h+0.59765625*G_h+0.1015625*B_h$$

$$Y_t=L(RGB)=0.30078125*R_t+0.59765625*G_t+0.1015625*B_t \qquad \text{expressions(2)}$$

$$r=Y_h/Y_t$$

Where $Y_h$ comprises a plurality of luminance values each corresponding to a different pixel in the input HDR image, $Y_t$ comprises a plurality of luminance values each corresponding to a different pixel in the tone-mapped image, and r comprises a plurality of luminance ratios each of which is defined as a ratio between a luminance value in $Y_h$ and a corresponding luminance value in $Y_t$. In some possible embodiments, $Y_h$, $Y_t$, and r may be expressed with matrices of the same dimensionality. A position in a matrix described herein, as indicated by a row index and a column index, may indicate a pixel in an image (e.g., the input HDR image, the tone mapped image, or a luminance ratio image formed by r). Luminance values from $Y_h$ and $Y_t$ and the luminance ratios from r correspond to one another if their positions share the same row index and the same column index in the matrices. In an alternative embodiment, the division operations (Div 716) as illustrated in FIG. 7 for computing r based on $Y_h$ and $Y_t$ are performed as subtractions in a logarithmic domain.

Under techniques as described herein, the luminance ratios r are computed using the tone mapped image ($RGB_t$) that comprises the outcome of color alteration operations performed by the TMO 706 or the user. The luminance ratios as computed in expressions (2), when multiplying the tone-mapped image, produce an image whose luminance values match the luminance values of the input HDR image.

If color balance is maintained by the TMO 706 and if there is no color clipping performed with the tone-mapped image by the TMO 706 or the user, a combined image created by a multiplication of the tone-mapped image with the luminance ratios r matches the input HDR image color by color.

On the other hand, if the tone mapped image comprises color alterations/distortions, for example, when the color balance in the input HDR image is changed by the TMO 706 in the tone mapped image, or if color clipping occurs in the TMO 106, the combined image created by a multiplication of the tone-mapped image with the luminance ratios r does not match the input HDR image color by color. Under the techniques described herein, differences in color channels other than the luminance channel are computed between the combined image and the input HDR image to produce residual values included in HDR reconstruction data. The HDR reconstruction data generated under the techniques described herein provides extra color information that was lost in the TMO 706 or in the operations performed by the user. When a downstream device such as an HDR image decoder or an HDR rendering device receives the TM image with the color alterations/distortions and the HDR reconstruction data, the color alterations/distortions in the TM image are compensated with the HDR reconstruction data.

As used herein, clipping refers to a type of color alternation that alters/modifies out-of-bound pixel values in color channels so that the resultant pixel values are within represented ranges. Clipping may happen to any color channels (e.g., R, G, and B pixel values in a RGB color space in a certain portion of the HDR image may be clipped in the TM image). Amounts of clipping may or may not vary with the color channels (e.g., more clipping for green, less clipping for blue, etc.).

Using the luminance ratios r, the input HDR image may be re-mapped to generate an intermediate re-mapped image (RGBht) whose color balance is not changed. $RGB_{ht}$ may be calculated with a division operation (Div 718) as follows:

$$RGB_{ht} = RGB_h/r \quad \text{expression (3)}$$

As explained above, if color balance was maintained by the TMO 706 and if there is no color clipping, the re-mapped image (RGBht) will be the same as the tone mapped image (RGBt). Otherwise, there will be differences in these two images. The differences between the two images are residual values in the tone mapping image space (e.g., a space comprising all possible tone mapped images). In an example embodiment, the residual values (RGBe) are calculated with subtractions (Sub 732) in the linear domain as follows:

$$RGB_e = RGB_{ht} - RGB_t \quad \text{expression (4)}$$

The residual values (RGBe) may be converted (by a CSC 134 block illustrated in FIG. 7) to an YCbCr color space. Under techniques herein, the tone mapped image (RGBt) and the re-mapped image (RGBht) have the same luminance values. The luminance residual values between these two images are all zeros. The residual values (RGBe) in the YCbCr color space comprise only chroma information (Diff CbCr 154) that needs to be saved. The conversion from RGBe to Diff CbCr may be given as follows:

$$\begin{bmatrix} Y_e \\ Cb_e \\ Cr_e \end{bmatrix} = M_{csc} * \begin{bmatrix} R_e \\ G_e \\ B_e \end{bmatrix} \quad \text{expression (5)}$$

Where MCSC and its inverse MCSC$^{-1}$ may be a 3×3 matrix defined as follows:

$$M_{csc} = \begin{bmatrix} 0.3007825 & 0.59765625 & 0.1015625 \\ -0.16739 & -0.3326 & 0.5 \\ 0.5 & -0.42737 & -0.0726 \end{bmatrix} \quad \text{expression (6)}$$

$$M_{csc}^{-1} = \begin{bmatrix} 1.0 & 0.0 & 1.3984 \\ 1.0 & -0.3054 & -0.7038 \\ 1.0 & 1.7969 & 0.0 \end{bmatrix}$$

Under techniques as described herein, the conversion coefficients used to compute luminance values in the input HDR image and the tone mapped image are exactly the same as those in MCSC in the expressions (5) and (6). Under these techniques, luminance residual values (Ye) in RGBe are all zeros, as shown below:

$$Y_e = L(RGB_e) \quad \text{expression (7)}$$

$$= L(RGB_{ht} - RGB_e)$$

$$= L(RGB_{ht}) - L(RGB_e)$$

$$= \frac{L(RGB_h)}{r} - L(RGB_e)$$

The luminance ratios r in the linear domain, as computed in expressions (2), have a wide range, because the ratios carry HDR information of the input image. In an example embodiment, for efficient quantization purposes, as illustrated in expression (8) below, the luminance ratios r are first converted (e.g., by a log block 730 of FIG. 7) to a logarithm domain. The maximum and minimum luminance ratio values in the logarithmic domain may be used to determine a logarithmic range (e.g., by a Min Max block of FIG. 7) with the upper limit and lower limit as lrmax and lrmin, respectively. The logarithmic luminance ratios may then be quantized (e.g., uniformly or according to a particular curve) (e.g., by a Quant 8b 736 block of FIG. 7) into 8-bit values Log $Y_t$ (or H in expression (8)) based on the logarithmic range. In an example, natural logarithm is used with the logarithmic domain. In other examples, logarithm with other bases other than that of natural logarithm is used with the logarithmic domain.

$$lr = \log(r)$$

$$lr_{min} = \min lr$$

$$lr_{max} = \max lr$$

$$H = (lr - lr_{min}/lr_{max} - lr_{min}) * 255 \quad \text{expression (8)}$$

In an example YCbCr color space, Cb and Cr residual values (denoted as U and V in expressions (9) and (10)) in Diff CbCr may be quantized to 8-bit values (CbCr 158), respectively, in a similar manner, as follows:

$$Cb_{min} = \min Cb$$

$$Cb_{max} = \max Cb$$

$$U = (Cb - Cb_{min}/Cb_{max} - Cb_{min}) * 255 \quad \text{expression (9)}$$

$$Cr_{min} = \min Cr$$

$$Cr_{max} = \max Cr$$

$$V = (Cr - Cr\ min/Cr_{max} - Cr_{min}) * 255 \quad \text{expression (10)}$$

In an example embodiment, after quantization, the HDR reconstruction data comprises three sets of two-dimensional data, H, U, and V (Log $Y_t$ and CbCr 758 in FIG. 7). The sets of data in the HDR reconstruction data may be saved/stored in a single YCbCr container 744 (e.g., a YUV image) comprising the luminance ratio values (in the luminance channel of the example YUV color space) and the residual values (in the chroma difference channels of the example YUV color space), as if they form an (e.g., YUV) image. At the end, two images may be obtained. One is a tone mapped image in the RGB color space, and the other is the HUV image in the YUV color space. The tone mapped image may be the output (R'G'B' 708) of the TMO 706, after black modification (Black Mod 110) and/or with optional desaturation (e.g., 150). Both tone mapped and HUV images may comprise 8-bit data, and may be compressed, for example, using a JPEG standard compression method. The HDR reconstruction data may be outputted in an application segment (APP SEG 746) with the tone mapped image in a single image file. The single image file may be in a standard-based or proprietary image file format (e.g., JPEG-HDR). The application segment may be a marker field (e.g., APP11 marker) in the image file format (e.g., as defined by the JPEG standard). In an example, the TM image forms a base image (RGB TM Base 748) after JPEG compression, and the HUV image is attached to the TM base image in an application segment (APP SEG 746) such as APP11 marker in an output HDR (e.g., 756) image file.

Techniques as described herein may be used to process both floating-point and fixed-point HDR images (e.g., a 16-bit linear image, a 14-bit gamma-corrected image, etc.). In an example embodiment, the TM base image and the HUV image are stored in standard JPEG format under JPEG-HDR techniques, commercially available from Dolby Laboratories, San Francisco, Calif. The TM base image is stored into an entropy coded data segment. The HUV image with parameters and auxiliary data is stored in an application segment such as APP11 application segment under JPEG-HDR, with an appropriate ID string (e.g., "DD").

Minimum and maximum values of quantization value ranges in the HUV may be stored in a type I segment. These minimum and maximum values include the maximum and minimum luminance ratio values in the logarithmic domain, the maximum and minimum values for Cb residual values, and the maximum and minimum values for Cr residual values. Optionally and/or alternatively, other information specifying the base image color space (e.g., sRGB, AdobeRGB) and residual mode (e.g., luminance ratio only) is included in the type I segment. If the residual mode is luminance ratio only, Cb and Cr related parameters and data may be ignored in later decoding.

In an example embodiment, the HUV image is stored in a type II segment, and may be split into multiple type II segments with index information in a header of the segments, if the data size of the HUV image exceeds a certain size e.g., 64k bytes.

Figure 8:
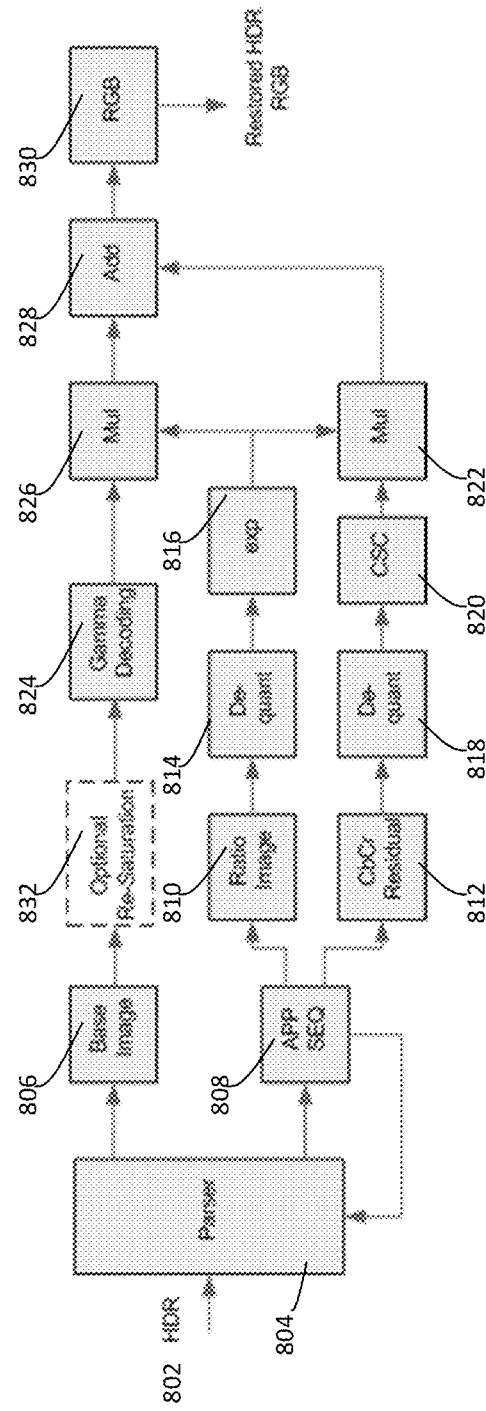
FIG. 8 illustrates an example HDR image decoder, according to some embodiments.

FIG. 8 illustrates an example HDR image decoder, in accordance with some possible embodiments of the present invention. In an example embodiment, the HDR image decoder is implemented by one or more computing devices, and configured with software and/or hardware components that implement image processing techniques for decoding HDR image data (denoted as HDR 802 in FIG. 8) comprising a tone mapped base RGB image and HDR reconstruction data. In an example embodiment, HDR reconstruction data refers to luminance ratio values, Cb and Cr residual values, and parameters and auxiliary data related to the foregoing data. In an example embodiment, the image data to be decoded by the HDR image decoder is in an image file in an image format (e.g., JPEG-HDR).

The HDR image decoder may comprise a parser (e.g., 804) configured to receive the HDR image data 802 (e.g., an JPEG-HDR image file in an enhanced format to store Cb and Cr residual values in addition to luminance ratios), and to parse the HDR image data 802 into the tone mapped base RGB image (denoted as Base Image 806 in FIG. 8) and one or more application segments (APP SEG 808) storing the HDR reconstruction data. In an example embodiment, the parser 804 is a standard JPEG decoder.

In an example embodiment, the HDR image decoder comprises software and/or hardware components configured to parse the one or more application segments (APP SEG 808) into a luminance ratio image (Ratio Image 810) and quantized Cb and Cr residual values (CbCr Residual 812). The luminance ratio image (Ratio Image 810) comprises quantized logarithmic luminance ratios.

In an example embodiment, the HDR image decoder comprises a de-quantization processing block (De-quant 814) configured to de-quantize the quantized logarithmic luminance ratios into logarithmic luminance ratios. The HDR image decoder comprises an inverse logarithm processing block (exp 816) configured to convert logarithmic luminance ratios into luminance ratios in a non-logarithmic domain.

In an example embodiment, the HDR image decoder comprises a de-quantization processing block (De-quant 818) configured to de-quantize the quantized Cb and Cr residual values into Cb and Cr residual values. The HDR image decoder comprises a color space conversion processing block (CSC 820) configured to convert Cb and Cr residual values into RGB residual values in the linear domain.

In an example embodiment, the HDR image decoder comprises a re-saturation block (832) configured to perform the inverse process of de-saturation, optionally and/or additionally, if the tone mapped base image is de-saturated by the encoder. In an example embodiment, the HDR image decoder comprises a gamma decoding processing block (Gamma Decoding 824) configured to perform gamma decoding on the tone mapped base RGB image (Base Image 806), optionally and/or additionally, if the tone mapped base image (Base Image 806) is gamma encoded. For example, a parameter in a type I segment of an application segment may indicate that the tone mapped based image is a gamma encoded RGB image (e.g., sRGB image).

The output of the gamma decoding processing block (Gamma Decoding 824) is multiplied with the luminance ratios from the ratio image on individual pixel basis to derive an intermediate HDR image in a Mul processing block 826, while the RGB residual values are multiplied with the same luminance ratios from the ratio image on individual pixel basis to derive a RGB residual image in a Mul processing block 822 (which may be the same as 826). The intermediate HDR image and the RGB residual image may be summed on individual pixel basis by a summing processing block (Add 828) to derive an HDR RGB image (RGB 830), which may be a restored version of the input HDR RGB image in FIG. 7.

In an alternative embodiment, pixel values in the TM base image and the RGB residual values are summed first. The results of the summations are then multiplied by the luminance ratios to derive the HDR RGB image.

FIG. 9 illustrates an example process flow according to a possible embodiment of the present invention. In some possible embodiments, one or more computing devices or components such as an HDR image decoder (e.g., as shown in FIG. 8) may perform this process flow. The HDR image decoder may be implemented by adding one or more new processing blocks to and/or modifying one or more existing processing blocks in, a standard-based image decoder such as a JPEG image decoder. In block 922, the HDR image decoder parses an image file comprising a tone-mapped (TM) image and HDR reconstruction data. In an example embodiment, the TM base image comprises results of any tone mapping operations with any tone mapping operator and/or any color alterations on any number of pixels. In an example embodiment, the HDR reconstruction data comprises quantized luminance ratio values (e.g., Y channel) and quantized residual values in color channels (e.g., Cb and Cr channels) of a color space (YUV). The TM base image comprises one or more color alterations that are not recoverable from the TM base image with a luminance ratio image. In an example embodiment, the image file is encoded in one of JPEG, JPEG-2000, MPEG, AVI, TIFF, BMP, GIFF, or another image format. In an example embodiment, the image file is parsed with a standard based image decoder, e.g., a JPEG decoder.

In block 924, the HDR image decoder extracts quantization parameters relating to the quantized luminance ratio values and the quantized residual values in the color channels of the color space.

In block 926, the HDR image decoder converts, based at least in part on the quantization parameters, the quantized luminance ratio values and the quantized residual values into luminance ratio values and residual values in the color channels of the color space. In an example embodiment, the quantized luminance ratios and the quantized residual values are stored in a residual image. In an example embodiment, the residual image and the TM base image are de-quantized and decompressed using a common procedure.

In block 928, the HDR image decoder reconstructs an HDR image using the TM base image and the luminance ratio values and residual values in the color channels of the color space.

The HDR image may be either a fixed-point image or a floating-point image.

In an example embodiment, the HDR image decoder performs an action of a color space conversion, a gamma encoding, a gamma decoding, a downsampling, or an upsampling, for example, on at least one of the TM base image, the residual image, the HDR image, or an intermediate image.

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control or execute instructions relating to HDR image coding and decoding, such as those described herein. The computer and/or IC may compute any of a variety of parameters or values that relate to HDR coding. The image and video dynamic range extension embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder or the like may implement HDR DCI coding and decoding methods as described above by executing software instructions in a program memory accessible to the processors. The invention may also be provided in the form of a program product. The program product may comprise any medium which carries a set of computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

Equivalents, Extensions, Alternatives and Miscellaneous

Example embodiments that relate to applying HDR image coding in digital cinema are thus described. In the foregoing specification, embodiments of the present invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method, comprising:
receiving a data packet in a bit stream that conforms to the Digital Cinema Systems Specification of the Digital Cinema Initiative (DCI Systems Standard), the data packet comprising at least a portion of a high dynamic range (HDR) image, wherein the HDR image comprises (a) a coded baseline image that complies with the DCI Systems Standard, and (b) one or more HDR-enhancement images;
wherein the coded baseline image comprises at least three color components, wherein the coded baseline image and the one or more HDR-enhancement images each provides enhancement information to allow reconstruction of an instance of the received HDR image using the baseline image and the HDR-enhancement images;
processing the data packet to reconstruct the HDR image by extracting:
a first data set that relates to the coded baseline image for the at least three color components; and
a second data set that relates to the one or more HDR-enhancement images,
wherein each of the HDR enhancement images comprises:
a first coded chroma residual image,
a second coded chroma residual image, and
a coded ratio image representing ratios of (i) luminance values of the HDR image and (ii) corresponding luminance values of a tone-mapped version of the HDR image,
wherein each of the residual images is configured to capture chroma information lost in creating the baseline image from the HDR image,
wherein the first coded chroma residual image and the second coded chroma residual image are based on the tone-mapped version of the HDR image and a re-mapped image representing an application of the ratios to the HDR image, and wherein the first coded chroma residual image is embedded within a first portion of the data packet that also includes baseline data for a first color component, the second coded chroma residual image is embedded within a second portion of the data packet that also includes baseline data for a second color component, and the coded ratio image is embedded within a third portion of the data packet that also includes baseline data for a third color component.

2. The method of claim 1, wherein the coded baseline image comprises a resolution of 2048×1080 (2K), or 4096×2160 (4K).

3. The method of claim 1, wherein the third portion of the data packet comprises an application marker that separates the baseline data for the third color component and the coded ratio image.

4. The method of claim 1, wherein the first portion of the data packet comprises an application marker that separates the baseline data for the first color component and the first coded chroma residual image.

5. The method of claim 1, wherein the second portion of the data packet comprises an application marker that separates the baseline data for the second color component and the second coded chroma residual image.

6. The method of claim 3, wherein the application marker conforms to a specification of the JPEG 2000 compressor/decompressor (codec) of the Joint Photographic Experts Group (JPEG).

7. The method of claim 1, wherein processing the data packet further comprises:
extracting quantization parameters relating to quantized values for the coded ratio image and the coded residual images for the one or more HDR-enhancement images;
converting, based at least in part on the quantization parameters, the quantized values into the coded ratio image and the coded residual images for the at least three color components; and
reconstructing the HDR image using the coded baseline image as well as the coded ratio image and the code residual images for the at least three color components.

8. An apparatus comprising a processor, wherein the processor is configured to:
receive a computed data packet in a bit stream that conforms to the Digital Cinema Systems Specification of the Digital Cinema Initiative (DCI Systems Standard), the data packet comprising at least a portion of a high dynamic range (HDR) image, wherein the HDR image comprises (a) a coded baseline image that complies with the DCI Systems Standard, and (b) one or more HDR-enhancement images;
wherein the coded baseline image comprises at least three color components, wherein the coded baseline image and the one or more HDR-enhancement images each provides enhancement information to allow reconstruction of an instance of the received HDR image using the baseline image and the HDR-enhancement images;
process the data packet to create the HDR image by extracting:
a first data set that relates to the coded baseline image for the at least three color components; and
a second data set that relates to the one or more HDR-enhancement images,
wherein each of the HDR enhancement images comprise:
a first coded chroma residual image,
a second coded chroma residual image, and
a coded ratio image representing ratios of (i) luminance values of the HDR image and (ii) corresponding luminance values of a tone-mapped version of the HDR image,
wherein each of the residual images is configured to capture chroma information lost in creating the baseline image from the HDR image,
wherein the first coded chroma residual image and the second coded chroma residual image are based on the tone-mapped version of the HDR image and a re-mapped image representing an application of the ratios to the HDR image, and
wherein the first coded chroma residual image is embedded within a first portion of the data packet that also includes baseline data for a first color component, the second coded chroma residual image is embedded within a second portion of the data packet that also includes baseline data for a second color component, and the coded ratio image is embedded within a third portion of the data packet that also includes baseline data for a third color component.

9. The apparatus of claim 8, wherein the coded baseline image comprises a resolution of either 2048×1080 (2K), or 4096×2160 (4K).

10. The apparatus of claim 8, wherein the third portion of the data packet comprises an application marker that separates the baseline data for the third color component and the coded ratio image, and wherein the application marker conforms to a specification of the JPEG 2000 compressor/decompressor (codec) of the Joint Photographic Experts Group (JPEG).

11. The apparatus of claim 8, wherein the first portion of the data packet comprises an application marker that separates the baseline data for the first color component and the coded ratio image, and wherein the application marker conforms to a specification of the JPEG 2000 compressor/decompressor (codec) of the Joint Photographic Experts Group (JPEG).

12. The apparatus of claim 8, wherein the processor is further configured to:
extract quantization parameters relating to quantized values for the coded ratio image and the coded residual images for the one or more HDR-enhancement images;
convert, based at least in part on the quantization parameters, the quantized values into the coded ratio image and the coded residual images for the at least three color components; and
reconstruct the HDR image using the coded baseline image as well as the coded ratio image and the code residual images for the at least three color components.

13. A method, comprising:
receiving a high dynamic range (HDR) image;
processing the received HDR image, wherein the received HDR image comprises (a) a coded baseline image that complies with the Digital Cinema Systems Specification of the Digital Cinema Initiative (DCI Systems Standard), and (b) one or more HDR-enhancement images are created from the received HDR image;
wherein the coded baseline image comprises at least three color components, wherein the coded baseline image and the one or more HDR-enhancement images each provide enhancement information to allow reconstruction of an instance of the received HDR image using the baseline image and the HDR-enhancement images;

computing a data packet, wherein the data packet comprises:
- a first data set that relates to the coded baseline image for the at least three color components; and
- a second data set that relates to the HDR-enhancement images, wherein each of the HDR enhancement images comprises:
- a first coded chroma residual image,
- a second coded chroma residual image, and
- a coded ratio image representing ratios of (i) luminance values of the received HDR image and (ii) corresponding luminance values of a tone-mapped version of the received HDR image, wherein the first coded chroma residual image and the second coded chroma residual image are based on the tone-mapped version of the received HDR image and a re-mapped image representing an application of the ratios to the received HDR image wherein the first coded chroma residual image is embedded within a first portion of the data packet that also includes baseline data for a first color component, the second coded chroma residual image is embedded within a second portion of the data packet that also includes baseline data for a second color component, and the coded ratio image is embedded within a third portion of the data packet that also includes baseline data for a third color component; and sending the computed data packet in a bit stream that conforms to the DCI Systems Standard.

14. The method of claim 13 wherein the coded baseline image comprises a resolution of 2048×1080 (2K), or 4096×2160 (4K).

15. The method of claim 13, wherein the third portion of the data packet comprises an application marker that separates the baseline data for the third color component and the coded ratio image.

16. The method of claim 13, wherein the first portion of the data packet comprises an application marker that separates the baseline data for the first color component and the first coded chroma residual image.

17. The method of claim 13, wherein the second portion of the data packet comprises an application marker that separates the baseline data for the second color component and the second coded chroma residual image.

18. The method of claim 17, wherein the application marker conforms to a specification of the JPEG 2000 compressor/decompressor (codec) of the Joint Photographic Experts Group (JPEG).

19. The method of claim 13, wherein computing the data packet comprises:
- generating the tone-mapped image based on the received HDR image;
- generating the coded ratio image by dividing luminance values of the received HDR image with the corresponding luminance values of the tone-mapped version of the received HDR image;
- applying the luminance ratio values to the received HDR image to create the re-mapped image; and
- determining the first coded chroma residual image and the second coded chroma residual image based on the re-mapped image and the tone-mapped image.

20. The method of claim 19, wherein computing the data packet further comprises:
- prior to dividing the luminance values of the received HDR image with the luminance values of the tone-mapped image, applying an inverse gamma correction to the tone-mapped image according to a gamma curve for the at least three color components.

* * * * *